Figure 1:
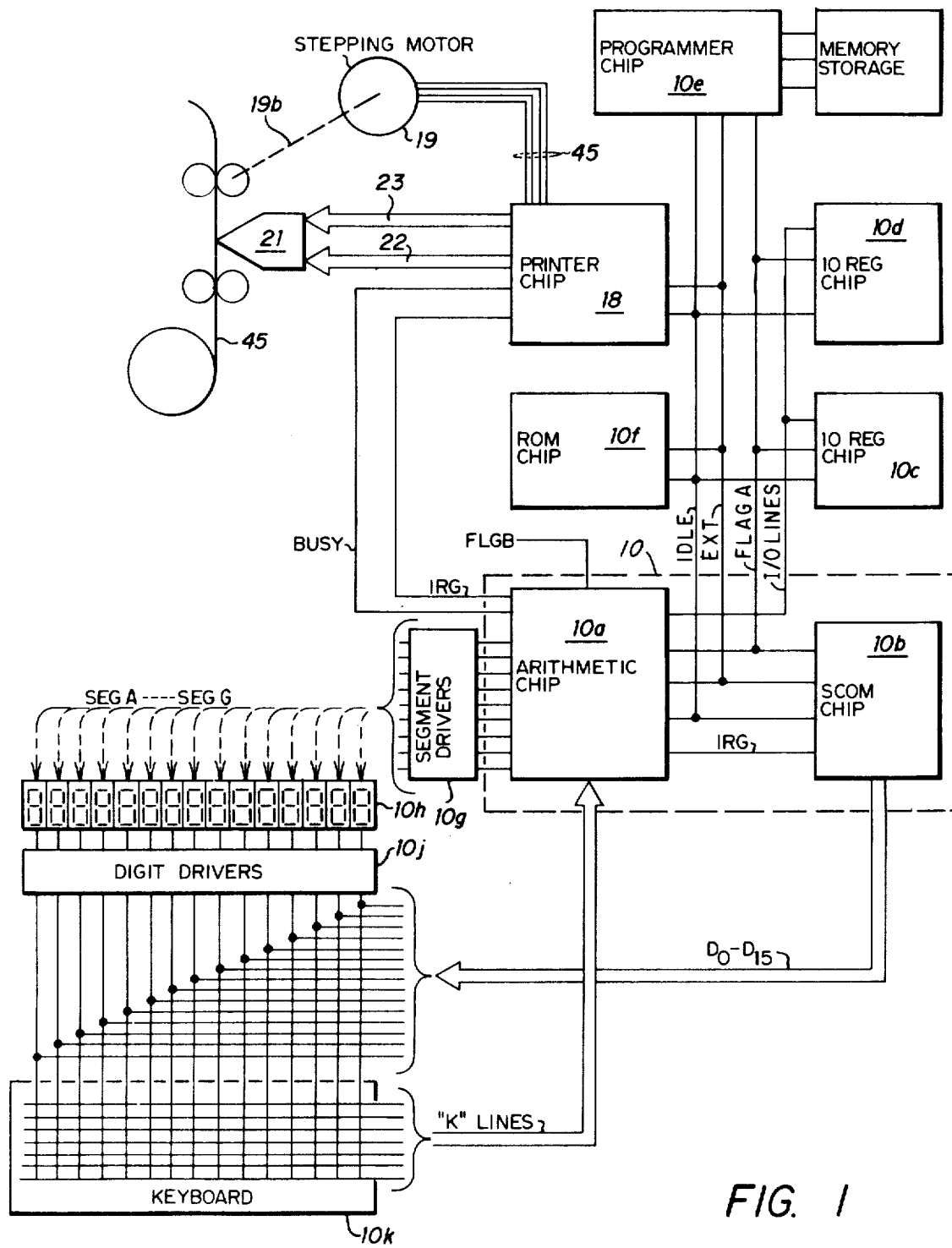

United States Patent [19]

Cochran et al.

[11] 4,145,756

[45] Mar. 20, 1979

[54] THERMAL LINE PRINTER

[75] Inventors: Michael J. Cochran, Richardson; Stephen P. Hamilton, Garland, both of Tex.

[73] Assignee: Texas Instruments Incorporated, Dallas, Tex.

[21] Appl. No.: 748,076

[22] Filed: Dec. 6, 1976

Related U.S. Application Data

[62] Division of Ser. No. 428,492, Dec. 26, 1973, Pat. No. 4,020,465.

[51] Int. Cl.² ............................................ G08B 5/36
[52] U.S. Cl. ................................... 364/900; 219/216
[58] Field of Search ............. 219/201, 216; 346/76 R; 364/200, 900; 101/1, 2, 12, 15, 45

[56] References Cited

U.S. PATENT DOCUMENTS

| 2,918,659 | 12/1959 | Gaddis et al. | 364/900 |
| 3,555,241 | 1/1971 | Carlsen et al. | 346/76 R |
| 3,870,856 | 3/1975 | Taniguchi | 346/76 R |
| 3,913,091 | 10/1975 | Aizawa et al. | 346/76 R |

Primary Examiner—Malcolm A. Morrison
Assistant Examiner—Errol A. Krass
Attorney, Agent, or Firm—Stephen S. Sadacca; James T. Comfort; Melvin Sharp

[57] ABSTRACT

A thermal printer system for actuating a plurality of groups of thermal printing elements. The system includes a first circuit in which a plurality of data words are stored, the words representing the characters to be printed. A second circuit converts the data words into printing character codes. A selected bit from each code, which bit is sequentially altered, is supplied to a third circuit for actuating the printing elements.

14 Claims, 1 Drawing Figure

THERMAL LINE PRINTER

This is a division of application Ser. No. 428,492, filed Dec. 26, 1973, now U.S. Pat. No. 4,020,465.

This invention relates to a thermal printing of a calculator output, and more particularly to a thermal printer having control circuits implemented on a semiconductor chip which receives from other calculator chips function and data signals to be printed along with control signals to synchronize printing with operation of the calculator.

Electronic desk top calculators and compact hand-held calculators are now readily available at low cost primarily because of advances in semiconductor technology. Availability of MOS/LSI chips has permitted the development of desk and hand calculators of capabilities far beyond those of the previous calculator generations.

In U.S. Pat. No. 3,984,816, a two chip calculator is disclosed in detail wherein there is provided a numeric display of the calculator results and functions. A one chip calculator is described in detail in U.S. Pat. No. 4,074,351.

The present invention relates to a printer including an auxiliary MOS/LSI chip which utilizes function and data signals from units such as embodied in the above-identified Texas Instruments calculators, along with control and timing signals to control a thermal printer. Thermally sensitive paper stepped past a printhead in coordination with the operation of the chip provides printout of the calculator results rather than or in addition to a mere display thereof.

A thermal printer system of the type utilizing strobed thermal printhead elements is set forth in U.S. Pat. No. 3,476,877. Such printer, however, features a clocking arrangement requiring external clock signals, and requires new data to be input for every line of dots output, thereby requiring several data inputs to the system per printed line of complete characters. Furthermore, the data input must be in a decoded format which directly actuate the respective dots in the output.

It is therefore an object of the present invention to provide a printing system utilizing storage means for storing character codes, especially in a calculator system. It is another object to provide a printing system for outputting an N character line, each character generated by actuation of an A×B matrix in accordance with codes selected from a character storage memory. It is another object to provide such a printing system which is responsive to serial data input which is selectively decoded and stored in a memory for addressing the character storage memory.

It is another object to provide such a printing system which decodes only serial data representing function print commands and storing a plurality of codes in response to a function command, while directly storing character print commands. It is still yet another object to provide such a printing system which drives a thermal printhead output printer having like positioned dots in each group of the N×A row actuated simultaneously and then the sequence of like dots in the groups strobed in accordance with output from the character storage memory.

In accordance with the present invention, a printer MOS/LSI chip is operated to generate its own internal commands and clock signal. A serial data stream and a print command in combination with a character storing memory are utilized for the selective energization of semiconductor heaters disposed in a linear array.

More particularly, a thermal printing system for actuating a plurality of groups of printing elements is provided by various circuits. One such circuit stores a plurality of data words representing the characters to be printed. A second circuit converts the data words into printing character codes a selected bit of which is provided to a third circuit. The third circuit actuates selected printing elements according to the state of the selected bits provided by the second circuit. Preferably, the first and third circuit include read/write memories while the second circuit includes a read-only-memory. In another aspect, a sequencer circuit is provided for sequentially selecting a different bit to be provided by the second circuit to the third circuit. In a further aspect, the sequencer circuit may be implemented by a first counter. Then a second counter is preferably provided for stepping thermally sensitive paper past the printing elements, the second counter being incremented after the first counter counts through all available states.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, wherein:

FIG. 1 is a simplified block diagram of a calculator system illustrating application of one aspect of the invention;

FIG. 1 accompanies this patent. FIGS. 2-15, as well as all textual matter relating to a detailed discussion of FIGS. 1-15 may be found in U.S. Pat. No. 4,020,465, which issued on Apr. 26, 1977 in the names of Michael J. Cochran and Stephen P. Hamilton.

FIGS. 2-15 as well as the text (including tables) at column 3, line 1 through column 20, line 39 of U.S. Pat. No. 4,020,465 is hereby incorporated herein by reference.

What is claimed is:

1. A thermal printing system for actuating a plurality of groups of thermal printing elements, said elements in each one of said groups being correspondingly disposed to provide a character representation upon actuation of selected elements, said system comprising:
   (a) first means for storing a plurality of data words representing the characters to be printed;
   (b) second means for converting said plurality of data words into a plurality of character printing codes and for reading out a selected bit from each of said codes;
   (c) third means for actuating selected elements in response to the state of the selected bit from each of said codes; and
   (d) sequencer means, operatively connected to said second means, for sequentially selecting a different bit to be read from said codes each time the plurality of words is converted by said second means.

2. The system according to claim 1, wherein said sequencer means sequentially enables corresponding disposed elements in said groups for printing, selected ones of said elements printing when both enabled by said sequencer means and actuated by said third means.

3. The system according to claim 2, wherein said means for converting said plurality of data words into a plurality of character printing codes is a read only memory for storing a repertoire of said character printing codes and wherein said data words address said read-only-memory to convert said words into corresponding printing codes.

4. The system according to claim 1, wherein said groups are disposed in dot matrices and wherein said means for converting said plurality of data words into a plurality of character words comprises a memory for storing a repertoire of such character printing codes and wherein each one of said character printing codes in said repertoire represent a different character printable by selective printing of the elements in said dot matrices.

5. A method of actuating a plurality of groups of heater elements, said elements in each one of said groups being correspondingly disposed to provide a character representation upon actuation of selected elements, said method comprising the steps of:
(a) storing a plurality of data words representing the characters to be printed;
(b) converting said data words into character printing codes;
(c) selecting a plurality bit from each of said printing codes;
(d) energizing selected elements according to the state of the particular bit selected from each of said codes; and
(e) sequentially altering the particular bit selected each time said plurality of said data words are converted to corresponding printing codes.

6. The method according to claim 5, wherein the step of converting said data words is accomplished by a memory storing a repertoire of such character printing codes and wherein said data words address said memory to convert each one of said data words to a corresponding printing code.

7. The method according to claim 5, wherein said groups of elements are arranged as dot matrices and wherein the step of sequentially altering the particular bit selected includes sequentially enabling correspondingly disposed elements for energization according to the state of the particular bit selected from each of said plurality of printing codes.

8. A thermal printing system for actuating a plurality of groups of thermal printing elements, said elements in said groups being disposed to provide a character representation upon actuation of selected elements, said system comprising:
(a) first means for storing a plurality of data words representing the character to be printed;
(b) second means for converting said plurality of data words into a plurality of character printing codes;
(c) third means for sequentially selecting a selected bit from said codes, said third means sequentially altering the bit selected; and
(d) fourth means for actuating selected printing elements in response to the state of said selected bits.

9. The system according to claim 8, wherein said groups are disposed in dot matrices, wherein said second means includes a memory for storing a repertoire of such character printing codes and wherein each one of said character printing codes in said repertoire represent a different character printable by selective printing of the elements in said dot matrices.

10. A thermal printing system for actuating a plurality of groups of thermal printing elements, said elements in said groups being disposed to provide a character representation upon actuation of selected elements, said system comprising;
(a) first means for storing a plurality of data words representing the characters to be printed;
(b) second means for converting said plurality of data words into a plurality of character printing codes;
(c) third means for selecting a selected bit from said codes, said third means selecting only one of said selected bits at any given time and sequentially selecting a different bit to be read from said codes; and
(d) fourth means for actuating selected printing elements in response to the state of said selected bits.

11. The system according to claim 8, wherein said fourth means includes a memory for temporarily storing the bits selected by said third means, said memory being coupled to said printing elements.

12. A thermal printing system comprising:
(a) a plurality of linear arrays of thermal printing elements, each of the elements in each of the arrays including a heating element;
(b) first means for coupling one side of the heating elements in each of said arrays to a common point, there being one such common point associated with each of said arrays;
(c) second means for storing a plurality of data words representing the characters to be printed by the system;
(d) a first counter;
(e) means for incrementing the state of said first counter;
(f) a second counter;
(g) means for incrementing the state of said second counter after said first counter has counted through all available states therein;
(h) third means for converting said plurality of data words into a plurality of character printing codes and for reading out a selected bit from each of said codes, the particular bit selected depending upon the states of said first and second counters;
(i) fourth means, responsive to the selected bits, for coupling selected ones of the common points to a first electrical potential; and
(j) fifth means for coupling selected ones of the other sides of said heating elements to a second electrical potential, the particular ones of the other sides of said heating elements being selected according to the state of said first counter;
(k) said heating elements heating in response to the application of said first electrical potential to said one side thereof and said second electrical potential to the other side thereof.

13. The thermal printer system as defined in claim 12, wherein said printer prints on thermally sensitive paper and further including means for stepping the thermally sensitive paper past said plurality of arrays in response to said second counter being incremented.

14. The system according to claim 13, wherein said first counter is a modulo five counter and said second counter is a modulo seven counter.

* * * * *